United States Patent [19]

Ohtsuki et al.

[11] Patent Number: 4,603,397
[45] Date of Patent: Jul. 29, 1986

[54] BINARY CODED DECIMAL NUMBER DIVISION APPARATUS

[75] Inventors: Toru Ohtsuki; Yoshio Oshima; Sako Ishikawa; Masaharu Fukuta, all of Hadano, Japan

[73] Assignee: Hitachi, Ltd., Tokyo, Japan

[21] Appl. No.: 462,423

[22] Filed: Jan. 31, 1983

[30] Foreign Application Priority Data

Feb. 16, 1982 [JP] Japan ................................. 57-23230

[51] Int. Cl.$^4$ .............................................. G06F 7/52
[52] U.S. Cl. .................................................... 364/763
[58] Field of Search ........................ 364/761, 763–767

[56] References Cited

U.S. PATENT DOCUMENTS

| 3,234,367 | 2/1966 | Ottaway et al. | 364/761 |
| 3,527,930 | 9/1970 | Cooke et al. | 364/761 |
| 3,917,935 | 11/1975 | Lazecki | 364/761 |
| 4,337,519 | 6/1982 | Nishimoto | 364/765 |
| 4,473,887 | 9/1984 | Odaka | 364/761 |

Primary Examiner—James D. Thomas
Assistant Examiner—Dale M. Shaw
Attorney, Agent, or Firm—Antonelli, Terry & Wands

[57] ABSTRACT

In preparation of addresses of a quotient prediction table used in a binary coded decimal number division scheme with predetermined bits of a dividend and a divisor in binary coded decimal representation, the addresses are modified with the redundant bits. The absolute bit number for the addresses is thus decreased, whereby data quantity and hence capacity of RAM required for implementing the quotient prediction table can be significantly reduced, while satisfactory function of the quotient prediction table being assured. The apparatus for the binary coded decimal number division is implemented inexpensively in a small size.

4 Claims, 12 Drawing Figures

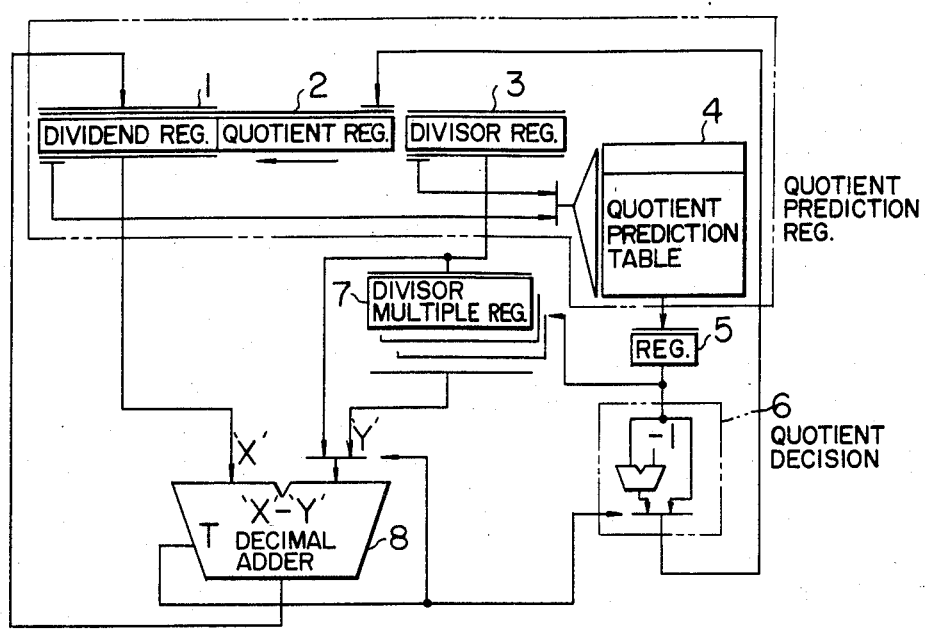

PREDICTION TABLE 4

| DIVIDEND / DIVISOR | 067X | 068X | 069X | 070X | 071X | 072X | 073X | 074X | 075X | 076X | 077X | 078X | 079X | 080X | 081X | 082X | 083X | 084X |
|---|---|---|---|---|---|---|---|---|---|---|---|---|---|---|---|---|---|---|
| 110 | 6 | 6 | 6 | 6 | 6 | 6 | 6 | 6 | 6 | 6 | 6/7 | 7 | 7 | 7 | 7 | 7 | 7 | 7 |
| 111 | 6 | 6 | 6 | 6 | 6 | 6 | 6 | 6 | 6 | 6 | 6/7 | 7 | 7 | 7 | 7 | 7 | 7 | 7 |
| 112 | 5/6 | 6 | 6 | 6 | 6 | 6 | 6 | 6 | 6 | 6 | 6 | 6/7 | 7 | 7 | 7 | 7 | 7 | 7 |
| 113 | 5/6 | 6 | 6 | 6 | 6 | 6 | 6 | 6 | 6 | 6 | 6 | 6 | 6/7 | 7 | 7 | 7 | 7 | 7 |
| 114 | 5 | 5/6 | 6 | 6 | 6 | 6 | 6 | 6 | 6 | 6 | 6 | 6 | 6/7 | 7 | 7 | 7 | 7 | 7 |
| 115 | 5 | 5 | 5/6 | 6 | 6 | 6 | 6 | 6 | 6 | 6 | 6 | 6 | 6 | 6/7 | 7 | 7 | 7 | 7 |
| 116 | 5 | 5 | 5/6 | 6 | 6 | 6 | 6 | 6 | 6 | 6 | 6 | 6 | 6 | 6/7 | 7 | 7 | 7 | 7 |
| 117 | 5 | 5 | 5 | 5/6 | 6 | 6 | 6 | 6 | 6 | 6 | 6 | 6 | 6 | 6 | 6/7 | 7 | 7 | 7 |
| 118 | 5 | 5 | 5 | 5/6 | 6 | 6 | 6 | 6 | 6 | 6 | 6 | 6 | 6 | 6 | 6/7 | 7 | 7 | 7 |
| 119 | 5 | 5 | 5 | 5 | 5/6 | 6 | 6 | 6 | 6 | 6 | 6 | 6 | 6 | 6 | 6 | 6/7 | 7 | 7 |

| DIVIDEND / DIVISOR | 27X | 28X | 29X | 30X | 31X | 32X | 33X | 34X | 35X | 36X | 37X | 38X | 39X | 40X | 41X | 42X | 43X | 44X |
|---|---|---|---|---|---|---|---|---|---|---|---|---|---|---|---|---|---|---|
| 50X | 5 | 5 | 5 | 5/6 | 6 | 6 | 6 | 6 | 6/7 | 7 | 7 | 7 | 7 | 7/8 | 8 | 8 | 8 | 8 |
| 51X | 5 | 5 | 5 | 5/6 | 5/6 | 6 | 6 | 6 | 6/7 | 6/7 | 7 | 7 | 7 | 7/8 | 7/8 | 8 | 8 | 8 |
| 52X | 5 | 5 | 5 | 5 | 5/6 | 6 | 6 | 6 | 6 | 6/7 | 6/7 | 7 | 7 | 7 | 7/8 | 7/8 | 8 | 8 |
| 53X | 5 | 5 | 5 | 5 | 5/6 | 5/6 | 6 | 6 | 6 | 6 | 6/7 | 7 | 7 | 7 | 7 | 7/8 | 7/8 | 8 |
| 54X | 4/5 | 5 | 5 | 5 | 5 | 5/6 | 6 | 6 | 6 | 6 | 6/7 | 6/7 | 7 | 7 | 7 | 7 | 7/8 | 7/8 |
| 55X | 4/5 | 5 | 5 | 5 | 5 | 5 | 5/6 | 6 | 6 | 6 | 6/7 | 6/7 | 7 | 7 | 7 | 7 | 7/8 |
| 56X | 4 | 4/5 | 5 | 5 | 5 | 5 | 5/6 | 5/6 | 6 | 6 | 6 | 6/7 | 7 | 7 | 7 | 7 | 7/8 |
| 57X | 4 | 4/5 | 5 | 5 | 5 | 5 | 5 | 5/6 | 6 | 6 | 6 | 6 | 6/7 | 6/7 | 7 | 7 | 7 | 7 |
| 58X | 4 | 4 | 4/5 | 5 | 5 | 5 | 5 | 5/6 | 5/6 | 6 | 6 | 6 | 6 | 6/7 | 6/7 | 7 | 7 | 7 |
| 59X | 4 | 4 | 4/5 | 5 | 5 | 5 | 5 | 5 | 5/6 | 6 | 6 | 6 | 6 | 6 | 6/7 | 7 | 7 | 7 |

FIG. 5a

QUOTIENT PREDICTION TABLE
BIT NUMBER

| SIGNIFICANT DIGIT (4 BITS) OF DIVISOR (IN BCD NUMBER) | NUMBER OF BITS ADDED TO DIVISOR | NUMBER OF BITS OF DIVIDEND |
|---|---|---|
| 1 ('0001') | 4 | 11 |
| 2 ('0010') | 3 | 8 |
| 3 ('0011') | 3 | 7 |
| 4 ('0100') | 2 (3) | 8 (7) |
| 5 ('0101') | 2 | 7 |
| 6 ('0110') | 2 | 7 |
| 7 ('0111') | 2 | 6 |
| 8 ('1000') | 1 (2) | 7 (6) |
| 9 ('1001') | 0 | 4 |

FIG. 5b

BIT SERIES

| SIGNIFICANT BIT SERIES OF DIVISOR $x_0 x_1 x_2 x_3 x_4 x_5 x_6 x_7$ | SIGNIFICANT BIT SERIES OF DIVIDEND $y_0 y_1 y_2 y_3 y_4 y_5 y_6 y_7 y_8 y_9 y_{10}$ |
|---|---|
| 0 0 0 1 X X X X | 0 0 0 X X X X X X X X |
| 0 0 1 0 X X X △ | 0 0 X X X X X X |
| 0 0 1 1 X X X △ | 0 0 X X X X X △ |
| 0 1 0 0 X X △ | 0 X X X X X X X |
| 0 1 0 1 X X | 0 X X X X X X △ |
| 0 1 1 0 X X | 0 X X X X X X △ |
| 0 1 1 1 X X | 0 X X X X X △ △ |
| 1 0 0 0 X △ | X X X X X X X |
| 1 0 0 1 △ △ | X X X X △ △ △ |

FIG. 5c

PREDICTED QUOTIENT NUMBER

| SIGNIFICANT DIGIT OF DIVISOR | NUMBER OF COMBINATIONS OF DIVISOR | NUMBER OF COMBINATIONS OF DIVIDEND | TOTAL |
|---|---|---|---|
| 1 | 10 | 60 (100) | 600 (1,000) |
| 2 | 5 (10) | 40 | 200 (400) |
| 3 | 5 (10) | 20 (40) | 100 (400) |
| 4 | 3 (5) | 80 | 240 (400) |
| 5 | 3 | 40 (80) | 120 (240) |
| 6 | 3 | 40 (80) | 120 (240) |
| 7 | 3 | 24 (80) | 72 (240) |
| 8 | 2 (3) | 50 | 100 (150) |
| 9 | 1 (3) | 10 (50) | 10 (150) |
| SUM TOTAL | | | 1,562 (3,220) |

FIG. 6

DECODING WITH NO REDUNDANCY

| BIT SERIES OF DIVISOR AND DIVIDEND | 1ST EXAMPLE OF ADDRESS DECODING | 2ND EXAMPLE OF ADDRESS DECODING |
|---|---|---|
| $x_4 x_5 y_4 y_5 y_6$ | $a_4 a_5 a_9 a_{10}$ | $a_4 a_5 a_9 a_{10}$ |
| 0 0 0 0 0 | 0 0 0 0 | 0 0 0 0 |
| 0 0 0 0 1 | 0 0 0 1 | 0 1 0 0 |
| 0 0 0 1 0 | 0 0 1 0 | 1 0 0 0 |
| 0 0 0 1 1 | 0 0 1 1 | 1 1 0 0 |
| 0 0 1 0 0 | 1 1 0 0 | 0 0 1 1 |
| 0 1 0 0 0 | 0 1 0 0 | 0 0 0 1 |
| 0 1 0 0 1 | 0 1 0 1 | 0 1 0 1 |
| 0 1 0 1 0 | 0 1 1 0 | 1 0 0 1 |
| 0 1 0 1 1 | 0 1 1 1 | 1 1 0 1 |
| 0 1 1 0 0 | 1 1 0 1 | 0 1 1 1 |
| 1 0 0 0 0 | 1 0 0 0 | 0 0 1 0 |
| 1 0 0 0 1 | 1 0 0 1 | 0 1 1 0 |
| 1 0 0 1 0 | 1 0 1 0 | 1 0 1 0 |
| 1 0 0 1 1 | 1 0 1 1 | 1 1 1 0 |
| 1 0 1 0 0 | 1 1 1 0 | 1 0 1 1 |

FIG. 7a

ADR. DECODING

| SIGNIFICANT 4 BITS OF DIVISOR | ADDRESS BIT SERIES OF QUOTIENT PREDICTION TABLE |
|---|---|
| $x_0 x_1 x_2 x_3$ | $a_0 a_1 a_2 a_3 a_4 a_5 a_6 a_7 a_8 a_9 a_{10} a_{11}$ |
| 0 0 0 1 | 1 $y_8$ $y_9$ $y_{10}$ X X $x_7$ $x_6 y_3$ X X $y_7$ |
| 0 0 1 0 | $x_6 x_6$ 1 0 X X $x_7 y_2 y_3$ X X $y_7$ |
| 0 0 1 1 | $x_6 x_6$ 1 1 X X $x_7 y_2 y_3$ X X $y_7$ |
| 0 1 0 0 | $x_6$ 1 0 $x_6$ X X $y_1 y_2 y_3$ X X $y_7$ |
| 0 1 0 1 | 0 1 0 1 X X $y_1 y_2 y_3$ X X $y_7$ |
| 0 1 1 0 | 0 1 1 0 X X $y_1 y_2 y_3$ X X $y_7$ |
| 0 1 1 1 | 0 1 1 1 X X $y_1 y_2 y_3$ X X $y_7$ |
| 1 0 0 0 | 0 0 0 0 X X $y_1 y_2 y_3$ X X $y_0$ |
| 1 0 0 1 | 0 0 0 1 X X $y_1 y_2 y_3$ X X $y_0$ |

FIG. 7b $a_0 = \overline{x_0} \cdot \overline{x_1} \cdot \overline{x_2} + \overline{x_1} \cdot x_2 \cdot x_6 + x_1 \cdot \overline{x_2} \cdot \overline{x_3} \cdot x_6$ $a_1 = \overline{x_0} \cdot \overline{x_1} \cdot \overline{x_2} \cdot y_8 + \overline{x_1} \cdot x_2 \cdot x_6 + x_1$ $a_2 = \overline{x_0} \cdot \overline{x_1} \cdot \overline{x_2} \cdot y_9 + x_2$ $a_3 = \overline{x_0} \cdot \overline{x_1} \cdot \overline{x_2} \cdot y_{10} + x_1 \cdot \overline{x_2} \cdot \overline{x_3} \cdot x_6 + (x_0 + x_1 + x_2) \cdot x_3$ $a_4 = x_4 + y_4$ $a_5 = x_5 + y_4$ $a_6 = \overline{x_0} \cdot \overline{x_1} \cdot x_7 + (x_0 + x_1) \cdot y_1$ $a_7 = \overline{x_0} \cdot \overline{x_1} \cdot \overline{x_2} \cdot x_6 + (x_0 + x_1 + x_2) \cdot y_2$ $a_8 = y_3$ $a_9 = y_5 + x_4 \cdot y_4$ $a_{10} = y_6 + x_5 \cdot y_4$ $a_{11} = \overline{x_0} \cdot y_7 + x_0 \cdot y_6$

FIG. 7c

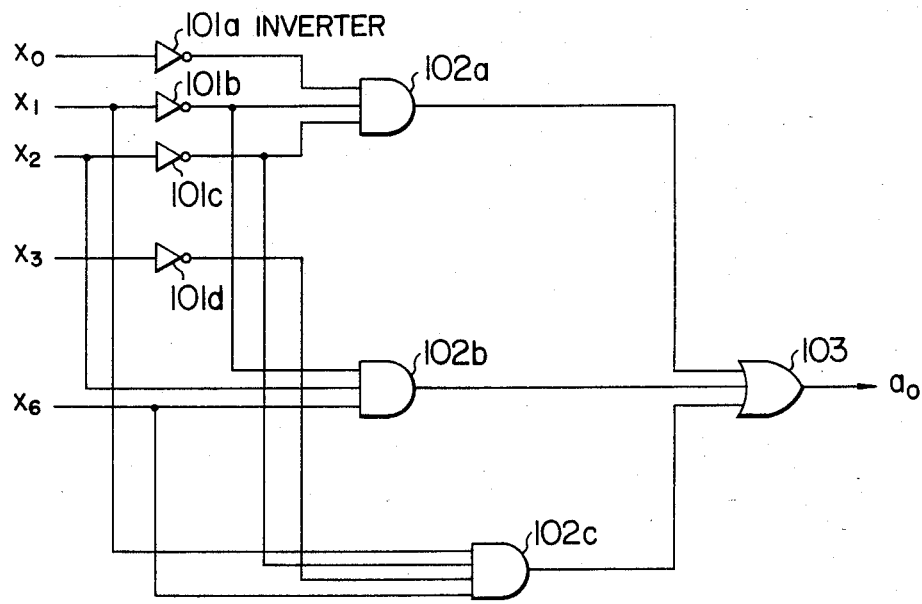

BINARY CODED DECIMAL NUMBER DIVISION APPARATUS

The present invention relates to an apparatus for division of binary coded decimal numbers in which a quotient represented in binary coded decimal notation is determined on a digit-by-digit basis by making reference to a quotient prediction table. In particular, the present invention concerns an improvement of the binary coded decimal number division apparatus such that the arithmetic operation can be performed by using the quotient prediction table which is made available with a reduced quantity of data.

In the division of binary numbers, it is already known to make use of a quotient prediction table with the view to attaining the high-speed arithmetic operation. In the case of a division of binary coded decimal numbers, it is equally possible to make use of a quotient prediction table for determining a quotient in binary coded decimal representation on a digit-by-digit basis starting from the most significant or highest-order digit.

FIG. 1 of the accompanying drawings shows a hitherto known binary coded decimal number division circuit in which a quotient prediction table is incorporated.

Referring to this figure, a dividend placed in a dividend register 1 and a divisor set in a divisor register 3 are applied to the inputs of a decimal adder 8 together with a selected one of divisor multiples stored in a divisor multiple register 7. In addition, the significant or higher-order bits of the dividend register 1 and the divisor register 3, respectively, are inputted to a quotient prediction table 4, whereby a predicted quotient is loaded in a quotient prediction register 5. The quotient determined by a quotient decision circuitry 6 is loaded in a quotient register 2.

The quotient prediction table 4 contains therein predicted quotients each represented by one digit (consisting of four bits) of the binary coded decimal number which is determined by the combination of an input value of the dividend and an input value of the divisor, i.e. the value corresponding to the correct quotients or the value greater than the correct one by "1". It is decided that the value in concern corresponds to the correct quotient if a carry is produced in actual subtraction of a multiple of the divisor from the dividend. On the other hand, if no carry is produced, it is determined that the subtraction is excessive. In the latter case, a one-fold multiple of the divisor is subsequently added. Operation of the hitherto known binary coded decimal addition circuit will be described below in more detail.

For determining the quotient of one binary coded decimal digit number on the basis of the value supplied from the dividend register 1 and the value available from the divisor register 3, a predicted quotient is deduced from the quotient prediction table 4 in dependence on the address which is prepared on the basis of a predetermined number of more significant bits of the dividend placed in the dividend, register 1 and a predetermined number of more significant bits of the divisor placed in the divisor register 3. The predicted quotient thus deduced is loaded in the quotient prediction register 5 also referred to as the predicted quotient register. Subsequently, among a group of registers 7 in which predetermined multiples of the divisor are stored, respectively, the divisor multiple register which is directly designated by the predicted quotient as determined is selected. The selected multiple "Y" of the divisor is then inputted to the decimal adder 8 to be subtracted from the dividend of value "X" stored in the dividend register 1. When the subtraction thus effected results in being positive (i.e. "X"−"Y"≧0), the value outputted from the decimal adder 8 (that is, the interim remainder) is transferred to the dividend register 1 to be stored therein. The dividend register 1 may thus be referred to as the interim remainder register as well. Simultaneously, the contents of the quotient prediction register 5 is transferred intact (i.e. as they are) to the quotient register 2 to be stored therein through the quotient decision circuit 6. After the quotient and the interim remainder have been stored in the register 2 and the register 1, respectively, the dividend register 1 and the quotient register 2 are shifted to the left by one digit of the binary coded decimal number. On the other hand, when the subtraction mentioned above is excessive, that is, the result of the subtraction is negative (i.e. "X"−"Y"<0), the value outputted from the decimal adder 8 is once transferred to the dividend register 1 to be stored therein, and the value is again inputted to the decimal adder 8 to be added with the value (one-fold multiple) of the divisor placed in the divisor register 3, the result of the addition being transferred as the interim remainder to the dividend register 1 to be newly stored therein. Simultaneously, a value which corresponds to the contents of the quotient prediction register 2 minus "1" is selected through the quotient decision circuit 6 and transferred to the quotient register 2 to be stored therein. In this manner, in case of the excessive subtraction, the interim remainder is correctively added with a value in excess of the subtrahend (i.e. one-fold multiple of the divisor) to thereby alter concurrently the quotient digit to the correct value. After the interim remainder and the quotient have been loaded, the dividend register 1 and the quotient register 2 are shifted to the left by one digit or position of the binary coded decimal number.

In this way, the operations mentioned above are repeated for a required number of times, whereby the quotient represented in the binary coded decimal notation is formed in the quotient register 2 on the digit-by-digit basis starting from the highest-order digit.

In the binary coded decimal number division scheme illustrated in FIG. 1, there is required the quotient prediction table which allows the predicted quotient itself (i.e. the correct value) or a value greater than the correct value by "1" to be derived in accordance with each combination of the values of the dividend and the divisor. It should however be noted in this connection that at least three digits of the dividend and two digits of the divisor are required in order that the quotient of one digit deducible from the values of the dividend and the divisor be restricted to two possible values, as described above.

FIG. 2 is a view illustrating a part of the quotient prediction table shown in FIG. 1.

In the quotient prediction table illustrated in FIG. 2, the dividends are arrayed in a row, while the divisors are listed in a column. There are shown in this fragmental table a subset of values which the quotient can assume on the basis of the values of the dividend and the divisor in the case where the value of the most significant digit of the divisor is "1" (one). Symbol "X" represents numerical values of the decimal number of one digit in the range from 0 to 9. For example, the expression "070X" represents ten possible values of "0700", "0701", "0702", and "0709" which "070X" can take. A number of numerical values indicated at intersections between rows and columns of the dividend and the divisor represent those which the relevant quotients can take, respectively. For example, expression "6/7" indicates that the quotient of one digit is either 6 or 7 for the relevant dividend and divisor.

Assuming now that the value of the quotient for two digits of the dividend and one digit of the divisor is to be determined on the conditions that the numerical values of the most significant two digits of the dividend is "07" and that the numerical value of the most significant one bit (i.e. the highest-order bit) of the divisor is "1", by way of example, then the quotient may take any one of five different numerical values of 3/4/5/6/7 shown as enclosed by a block A. Further, the quotient for two digits of the dividend and two digits of the divisor, e.g. the quotient for a dividend "07X" and a divisor "11X" may take one of three different values of 5/6/7 shown as enclosed by a block B. Furthermore, the quotient for a dividend "071X" and a divisor "1X" may take any one of five different values of 3/4/5/6/7 shown as enclosed by a block C. In this manner, in the case of the hitherto known quotient prediction table illustrated in the FIG. 2, the numerical value which the quotient may take can not be restricted to only two different values in the case of the combinations of the dividends and the divisors whose number of digits are "2" and "1", "2" and "2" or "3" and "1", respectively.

In contrast, the numerical value which the quotient may take for the combination of a three-digit dividend and a two-digit divisor can be restricted to only two different values of 6/7 shown as enclosed by a block D.

As will be now apparent, the value which the quotient may take for the combinations of three-digit dividend and two-digit divisor, respectively, can be restricted to two different numerical values, provided that the most significant or highest-order digit of the divisor is "1". Then, the quotient prediction table may be correspondingly prepared on the basis of these values. Further, in order to realize the prediction table in such a structure that a predicted quotient can be derived as a function of an address which prepared on the basis of a three-digit dividend and a two-digit divisor, the absolute amount of the address bits will amount to the number of bits which corresponds to five digits of a binary coded decimal number, i.e. as many as 20 bits because one digit consists of four bits. Assuming now that the quotient prediction table is realized by using high-speed random access memories (RAMs) each of 4K-bit capacity, the number of the required RAMs will amount to 1024 ($=2^{20} \times 4/4096$) because four bits are demanded for one digit of a binary coded decimal quotient, which RAM number is enormous.

An object of the present invention is to obviate the problems of the hitherto known apparatus described above and provide an improved divisor apparatus for binary coded decimal numbers in which the absolute quantity of address bits for the quotient prediction table is significantly decreased to thereby allow the total data quantity to be correspondingly reduced and which can nevertheless assure the same functional performance as that of the hitherto known division apparatus.

In view of the above and other objects which will be more apparent as description proceeds, there is provided an apparatus for division of binary coded decimal numbers in which a dividend in binary coded decimal representation is divided by a divisor in binary coded decimal representation on a digit-by-digit basis by referring to a quotient prediction table which furnishes a correct quotient or a value greater than the correct quotient by "1" in which case "1" is subtracted from the furnished value, to thereby determine the quotient, wherein upon addressing the quotient prediction table, higher-order bits of each of the dividend and the divisor which are binary coded decimal numbers are supplied to a decoder to be so modified that addresses are also assigned to redundant portions of the dividend and the divisor, i.e. to those portions $(1010)_2 - (1111)_2$. Here, the denotation $(\ )_2$ means that the number in the bracket is represented in binary notation.

The above and other objects, features and advantages of the present invention will be more apparent when reading the following detailed description of preferred embodiments of the invention. The description makes reference to the accompanying drawings, in which:

FIG. 1 is a block diagram showing a full arrangement of a binary coded decimal number division circuit of the prior art in which a quotient prediction table is made use of;

FIG. 2 is a diagram for illustrating a structure of a portion of the quotient prediction table shown in FIG. 1;

FIGS. 5a, 5b and 5c are diagrams for illustrating the bit numbers of divisors and dividends, representations (or expressions) thereof in bit series and the number of quotient in the quotient prediction table prepared according to an embodiment of the invention;

FIG. 6 is a diagram for illustrating a decoding procedure in which redundant portion of a binary coded decimal number is made use of;

FIG. 7a is a diagram for illustrating a procedure of decoding addresses of the quotient prediction table according to an embodiment of the present invention;

FIG. 7b is a diagram showing logical expression (Boolean expressions) for illustrating the decoding of the addresses of the quotient prediction table; and FIG. 7c shows a logical gate circuit for realizing some of the logical expressions shown in FIG. 7b.

Figures 3, 4A, 4B:
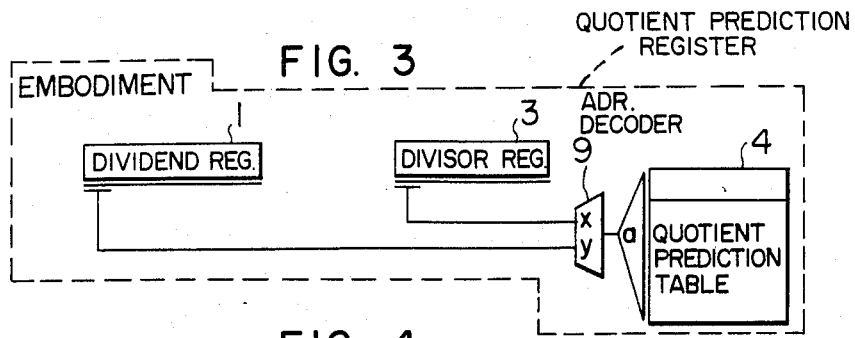
FIG. 3 shows in block diagram the arrangement of the Quotient Prediction Register of FIG. 1, according to an embodiment of the present invention.
FIGS. 4a and 4b are diagrams illustrating, respectively, quotient prediction tables used in the division circuit shown in FIG. 3.

Now, the invention will be described in detail in conjunction with the preferred embodiments by referring to FIGS. 3 et seq.

FIG. 3 shows in a block diagram an arrangement of a main portion of a binary coded decimal number division circuit according to an embodiment of the invention, while FIGS. 4a and 4b illustrate two portions of the quotient prediction table utilized in the division circuit or apparatus shown in FIG. 3.

Generally, the quotient prediction table 4 (FIG. 3) is so prepared as to furnish a value corresponding to the correct quotient or a value greater than it by one ("1") in determining the quotient in binary coded decimal representation on a digit-by-digit basis. So far as this is concerned, the quotient prediction table 4 is identical with the hitherto known one.

In order that the number of values which the one digit of quotient in decimal representation may take in the course of determination of the quotient on a digit-by-digit basis is restricted to two, i.e. the value corresponding to the correct quotient or the value greater than it by one, there are required the most significant three digits of the dividend in decimal representation and the most significant two digits of the divisor also in decimal representation. However, in the case of the division of binary coded decimal numbers, the lengths of portions of the dividend and the divisor which are required for the quotient prediction can be decreased on a bit basis.

As an example, referring to FIG. 3, it is possible that three bits of the higher digits of the dividend register 1 and two bits of the higher digits of the divisor register 3 are inputted to a table address decoder 9 which generates a 4-bit address from the five inputted bits in total, to thereby allow one bit to be spared. This will also be explained with reference to FIG. 6 later.

In FIGS. 4a and 4b, there are shown the numbers of bits of the dividend and divisor required for preparation of the address of the quotient prediction table. More particularly, FIG. 4a shows a part of values which quotients may take for the dividends and the divisors in the assumed case where the most significant two digits of the divisor are "11". As will be seen, any possible quotient is restricted to one or two values in correspondence with three digits (12 bits) of the dividend and two digits (8 bits) of the divisor, wherein the quotient may take one of ten values contained in each of the columns. For example, in case the dividend is "067" and the divisor is "11", the quotient may take one of ten values in the rows 110 to 119 at the column 067X, i.e. one of "5" and "6".

Here, let the least significant bit be removed from 12 bits which constitute the most significant three digits of the dividend. In this connection, the removal of this one bit means that "07X" represented in decimal notation, for example, is classified into five groups of "070-071", "072-073", "074-075", "076-077" and "078-079" in contrast to the fact that ""07X" is classified into ten groups of "070", "071", "072", . . . , "079" when the dividend is 12 bits. Accordingly, the value which the quotient may take for the dividend of 11 bits and the divisor of 8 bits is one of twenty elemental values contained in the columns corresponding to the dividends which have the eleven significant bits equal to each other, e.g. one of the twenty values contained in the columns 070 and 071 in decimal representation. Namely, in the assumed case, the value which the quotient may take is restricted to one of two values 5 or 6 in the columns 070 and 071. For the same reason, the number of the value which the quotient may take is restricted to two for other dividends and divisors.

When one more bit is further removed from the dividend so that the latter is of 10 bits, the decimal representation "07X", for example, is classified into three groups "070-073", "074-077" and "078-079".

When the value which the quotient may take for each of these three groups is determined from the table shown in FIG. 4a, it is seen that the number of values to be taken by the quotient is also restricted to two.

When the bit number in concern of the dividend is further decreased to 9 in the similar manner, the quotient may take one of three values "5/6/7" in the group "070 to 077", for example. In other words, the number, of values which the quotient may take can no longer be restricted to two.

As will be apparent from the above analysis, there are required at least 10 bits of the dividend and 8 bits of the divisor in order that the number of values which the quotient may take is restricted to two, provided that the most significant two digits of the divisor is "11".

FIG. 4b shows a part of the values which the quotient may take for dividends and divisors on the assumption that the most significant digit of the divisor is "5". The number of values to be taken by the quotient in correspondence to two digits (8 bits) of the dividends and two digits (8 bits) of the divisors is restricted to two.

When the procedure for decreasing the number of bits of the dividend as described above in conjunction with the table shown in FIG. 4a is applied to the quotient prediction table shown in FIG. 4b, it can also be seen that the number of values which the quotient may take can be restricted to no more than two even though 8 bits of the dividends are classified into groups each including two columns, as indicated by thick vertical lines. Further, even though 8 bits of the divisors are divided into groups each including four rows, as indicated by heavy horizontal lines, the number of values which the quotient may take can be restricted to two. Accordingly, it is safe to say that 7 bits of the dividend and 6 bits of the divisor are sufficient for restricting the number of values which the quotient may take to two or less, when the most significant digit of the divisor is "5".

FIGS. 5a, 5b and 5c are diagrams illustrating the number of bits, representation in bit series and the number of the predicted quotients to be registered in the quotient prediction table which are required for determining the quotient of one digit in binary coded decimal representation.

More specifically, FIG. 5a shows the numbers of bits required for the dividend and the divisor which are obtained through the aforementioned procedure applied to the case in which the most significant digits of the divisor are "1", "2", "3", . . . , "9", respectively.

In order that the value which the one-digit quotient may take is restricted to the value corresponding to the correct quotient or the value greater than the latter by one upon determination of the quotient digit by digit in binary coded decimal representation, the numbers of bits shown in FIG. 5a are required for the dividends and the divisors, respectively. For example, when the most significant digit of the divisor is "1", 8 bits are required for the divisor, while for the divisor having the most significant digit of "9", four bits are required for the divisor and so forth. It will thus be seen from FIG. 5a that the greater the value of the most significant digit of the divisor is, the more the range of values which the quotient may take is narrowed, permitting the numbers of bits required for the dividend and the divisor, respectively, to be correspondingly decreased.

In FIG. 5b, the numbers of bits required for the dividends and the divisors shown in FIG. 5a are represented in a bit series of the dividends and the divisors, respectively. Referring to FIG. 5b, marks X represent the bits to be supplemented to the divisors as well as those bits which are required for the dividends, while a mark Δ represents a bit which may be supplementarily added for the purpose of increasing the probability of the number of the value taken by the quotient being restricted to one for the given combination of the divisor and the dividend. The bit represented by the mark Δ is of significance in modifying the addresses of the quotient prediction table, as will hereinafter be elucidated.

FIG. 6 is a diagram for illustrating two examples of address decoding effected for reducing the absolute quantity of addresses for the divisors and the dividends by utilizing the redundant portion (10–15), i.e. $(1010)_2$–$(1111)_2$, of the binary coded decimal number, as applied to the divisors and the dividends shown in FIG. 5b.

Referring to FIG. 5b, since the two bits represented by $x_4$ and $x_5$, respectively, are the most significant two bits of the second-order digit of a binary coded decimal number, combinations of binary codes or values which the bits $x_4$ and $x_5$ may take are three in number, that is, $(00)_2$, $(01)_2$ and $(10)_2$. For the same reason, combinations of binary codes or values which the most significant three bits $y_4$, $y_5$ and $y_6$ of the second digit of a divisor in binary coded decimal representation are five. They are $(000)_2$, $(001)_2$, $(010)_2$, $(011)_2$ and $(100)_2$. Accordingly, a bit series consisting of five bits $x_4$, $x_5$, $y_4$, $y_5$ and $y_6$ can be decoded in a binary number of four bits, examples of which are shown in FIG. 6. In more detail, the five bits $x_4$, $x_5$, $y_4$, $y_5$ and $y_6$ can take fifteen (15) combinations as a whole. The combinations of a five-bit series can be decoded in a binary number of four address bits to thereby reduce the bit number of the address bit series by one bit. This is called "address modification" in the present description. In addition to the decoding exemplified by the first example, a second decoding in which the first two bits and the last two bits in the first example are replaced by each other may be adopted. These decodings can be represented by the following logical expressions which can be readily realized by using OR gates and AND gates. Accordingly, illustration of the decoder circuit is omitted herein.

| ADDRESS DECODING | |
|---|---|
| First Example | Second Example |
| $a_4 = x_4 + y_4$ | $a_4 = y_5 + x_4 \cdot y_4$ |
| $a_5 = x_5 + y_4$ | $a_5 = y_6 + x_5 \cdot y_4$ |
| $a_9 = y_5 + x_4 \cdot y_4$ | $a_9 = x_4 + y_4$ |
| $a_{10} = y_6 + x_5 \cdot y_4$ | $a_{10} = x_5 + y_4$ |

FIG. 5c shows the number of the predicted quotients to be registered in the quotient prediction table, wherein the numbers of combinations which the divisor and the dividend may form, respectively, for the values of the most significant digit of the divisor are determined on the basis of the contents of the table shown in FIG. 5b. The number of combinations of the divisors and dividends which constitute the quotient prediction table is 1,562 in total, to say the least. When the divisor or dividend is supplemented with the bits indicated by the mark Δ in FIG. 5b with the view to improving the accuracy and reliability for the quotient prediction, i.e. increasing the probability of the predicted quotient being correct as well as simplification of decoding logics, the total number of the combinations of the divisor and the dividend amounts to 3,220 as indicated in bracket in FIG. 5c. Since $3,220 < 4,096 (=2^{12})$, the address of the quotient prediction table can be composed of 12 bits.

FIG. 7a shows examples of the address of the quotient prediction table which is prepared with 12 bits on the basis of the results of the decodings of the divisor and the dividend in the manner illustrated in FIG. 6. In FIG. 7a, a mark * represents the decoded address bit series illustrated in FIG. 6.

More particularly, the results obtained from the decoding of the five bits $x_4$ $x_5$ $y_4$ $y_5$ $y_6$ of the divisor and the dividend to the address bit series consisting of four bits $a_4$ $a_5$ $a_9$ $a_{10}$ are adopted as they are, while the addresses for the divisors whose most significant digit is of a value ranging from 1 to 4, i.e. the addresses for the divisors and the dividends each having a larger number of bits to be decoded are assigned to the 12-bit series by making use of the redundant portion of the binary coded decimal number.

Next, description will be made of an example of a method of decoding an address bit series of the quotient prediction table corresponding to the most significant digit of a divisor.

In the case where $x_0$ $x_1$ $x_2$ $x_3 = (0001)_2$, the significant bit series of the dividend to be decoded includes 12 bits as shown in FIG. 5b. Since the bit series $y_8$ $y_9$ $y_{10}$ of the dividend corresponds to three bits of the third significant digit of a binary coded decimal number, there are available five values which can be taken by these bits, that is, $(000)_2$, $(001)_2$, $(010)_2$, $(011)_2$ and $(100)_2$. Correspondingly, the address bit series $a_0$ $a_1$ $a_2$ $a_3$ may be decoded in the five binary numbers of four bits $(1000)_2$, $(1001)_2$, $(1010)_2$, $(1011)_2$ and $(1100)_2$.

In accordance with the procedure shown in FIG. 6, the five bits $x_4 x_5 y_4 y_5 y_6$ of the divisor and the dividend are decoded to the address bit series of four bits to thereby spare one bit, with the remaining four bits being decoded to $a_6$, $a_7$, $a_8$ and $a_{11}$.

Next, in the case where the divisor is one of 5 to 9, i.e. $x_0$, $x_1$, $x_2$, $x_3 = (0101)_2$, ..., $(1001)_2$, the number of the bits of the divisor and the dividend to be decoded is at most 9 as shown in FIG. 5b. Through the same procedure as mentioned above, the five bits $x_4$ $x_5$ $y_4$ $y_5$ $y_6$ of the divisor and the dividend are decoded to the four bits $a_4$ $a_5$ $a_9$ $a_{10}$ of the address bit series to thereby spare one bit, while the address bit series $a_0 a_1 a_2 a_3$ is allotted with $(0101)_2$, $(0110)_2$, $(0111)_2$, $(0000)_2$ and $(0001)_2$, respectively (refer to FIG. 7a).

In the case where the divisor is one of 2, 3 and 4, i.e. $x_0$, $x_1$, $x_2$, $x_3 = (0010)_2$, ..., $(0100)_2$, the number of bits of the divisor and the dividend is at most ten. In the same manner as mentioned above, the five bits $x_4$ $x_5$ $y_4$ $y_5$ $y_6$ of the divisor and the dividend are decoded to the four bits of the address bit series $a_4$ $a_5$ $a_9$ $a_{10}$, to thereby spare one bit. The four bits $x_7$ $y_2$ $y_3$ $y_7$ (except $x_6$) of the remaining five are decoded intact, while the final one bit $x_6$ is utilized for expanding twice the address region of the quotient prediction table corresponding to the values of $x_0$ $x_1$ $x_2$ $x_3$, i.e. for 256 $(=2^8)$ entries. Namely, in correspondence to $x_0$ $x_1$ $x_2$ $x_3$ of $(0010)_2$, $(0011)_2$ and $(0100)_2$, the address bits $a_0 a_1 a_2 a_3$ are assigned with $(x_6 x_6 1 0)_2$, $(x_6 x_6 1 1)_2$ and $(x_6 1 0 x_6)_2$, respectively.

FIG. 7b shows the logical expressions for realizing the address decoding illustrated in FIG. 7a, while FIGS. 7c show an example of a gate logic circuit for executing the logic expression $a_0$ shown in FIG. 7b. In FIG. 7c, 101a to 101d denote inverters having inputs supplied with the divisor bits, and 102a to 102c denote AND gates, among which the gate 102b has one input supplied with the divisor bit $x_6$. A numeral 103 denotes an OR gate through which the outputs of the AND gates 102a to 102c are ORed to the decoder output $a_0$.

As will be appreciated from the foregoing description, the invention teaches that when the quotient prediction table is realized, the addresses of the quotient prediction table are prepared by the predetermined bits of the divisor and the dividend shown in FIG. 5b, wherein the redundant portions thereof are utilized for modifications of the addresses through the quotient table address decoder 9 by taking advantage of the fact that the divisor and the dividend are represented in binary coded decimal notation.

It will be understood that the absolute bit quantity of the address for the quotient prediction table which furnishes the correct quotient or a value greater than it by one in dependence on a few significant bits of the dividend and those of the divisor can be reduced to 12 bits (FIG. 7), whereby the quotient prediction table can be realized with four RAMs, which means that the quotient prediction table can be miniaturized to three fifth in the absolute quantity of address bits and 1/80 (=4K/3200K) in terms of the data quantity required for the table, as compared with the quotient prediction table in which no modification of the address is made at the redundant portion.

In the foregoing embodiment, a marginal bit marked by Δ in FIG. 5b is used to increase such a probability that the numerical value which quotients may take from the combinations of dividends and divisors is only one value. However, the marginal bit may be omitted to reduce the allowable address capacity of the quotient prediction table up to 11 bits.

What is claimed is:

1. An apparatus for division of binary coded decimal numbers in which a quotient is determined on a digit-by-digit basis from a dividend and a divisor represented in binary coded decimal notation, respectively, by referring to a quotient prediction table which furnishes a digit value corresponding to the correct quotient or value greater than it by one, the value furnished by said quotient prediction table being subtracted by one when said value does not correspond to the correct quotient, comprising:

a dividend-remainder register; a divisor register; a memory for storing the quotient prediction table having a reduced data capacity for compressed address bit length: a quotient register connected to the output of said memory; an address decoder coupled to receive divisor bits and dividend bits from said divisor register and said dividend register, respectively, for decoding said received bits to generate addresses of said quotient prediction table; and means responsive to a digit value read out of said memory as provided in said quotient register and the contents of said dividend-register and said divisor register for generating a quotient;

said address decoder including address bit length determining means for determining, in accordance with the most significant digit value of the divisor, the numbers of significant bits of said dividend and said divisor necessary for deriving the predicted quotient; and address modification means responsive to said address length determining means for modifying the necessary number of significant bits thus determined so as to be rearranged into an address bit series of a reduced bit length as an address output based on bit-compressive decode logic predetermined essentially using redundant bits in binary coded decimal representation of said divisor and said dividend.

2. An apparatus for division of binary coded decimal numbers in which a quotient is determined on a digit-by-digit basis from a dividend and a divisor represented in binary coded decimal notation, respectively, by referring to a quotient prediction table which furnishes a digit value corresponding to the correct quotient or value greater than it by one, the value furnished by said quotient prediction table being substracted by one when said value does not correspond to the correct quotient, comprising:

a dividend-remainder register; a divisor register; a memory for storing the quotient prediction table having a reduced data capacity for compressed address bit length; a quotient register connected to the output of said memory; an address decoder coupled to receive divisor bits and dividend bits from said divisor register and said dividend register, respectively, for decoding said received bits to generate addresses of said quotient prediction table; and means responsive to a digit value read out of said memory as provided in said quotient register and the contents of said dividend-remainder register and said divisor register for generating a quotient;

said address decoder including address bit length determining means for determining, in accordance with the most significant digit value of the divisor, the numbers of significant bits of said dividend and said divisor necessary for deriving the predicted quotient; and address modification means responsive to said address bit length determining means for modifying the necessary number of significant bits thus determined to allot them in an address bit series of a reduced bit length based on a bit-compressing decode format predetermined essentially using redundant bits $(1010)_2-(1111)_2$ in binary coded decimal reoresentation of said dividend and said divisor to thereby provide an address output.

3. A binary coded decimal number division apparatus according to claim 2, wherein the bit numbers of said dividend and said divisor in binary coded decimal representation which are required for obtaining the predicted quotient include 11 significant bits and 8 significant bits, respectively, and the address bit series of a reduced bit number for said quotient prediction table contains 12 bits.

4. A binary coded decimal number division apparatus according to claim 3, wherein when the bit series of said divisor is represented by $x_0\ x_1\ x_2\ x_3\ x_4\ x_5\ x_6\ x_7$ the bit series of said dividend is represented by $y_0\ y_1\ y_2\ y_3\ y_4\ y_5\ y_6\ y_7\ y_8\ y_9\ y_{10}$ and said address bit series is represented by $a_0\ a_1\ a_2\ a_3\ a_4\ a_5\ a_6\ a_7\ a_8\ a_9\ a_{10}\ a_{11}$, decoded outputs are produced in accordance with the following logical expressions:

$a_0 = x_0 \cdot x_1 \cdot x_2 + x_1 \cdot x_2 \cdot x_6 + x_1 \cdot x_2 \cdot x_3 \cdot x_6$ $a_1 = x_0 \cdot x_1 \cdot x_2 \cdot y_8 + x_1 \cdot x_2 \cdot x_6 + x_1$ $a_2 = x_0 \cdot x_1 \cdot x_2 9 \cdot y_9 + x_2$ $a_3 = x_0 \cdot x_1 \cdot x_2 \cdot y_{10} + x_1 \cdot x_2 \cdot x_3 \cdot x_6 + (x_0 + x_1 + x_2) \cdot x_3$ $a_4 = x_4 + y_4$ $a_5 = x_5 + y_4$ $a_6 = x_0 \cdot x_1 \cdot x_7 + (x_0 + x_1) \cdot y_1$ $a_7 = x_0 \cdot x_1 \cdot x_2 \cdot x_6 + (x_0 + x_1 + x_2) \cdot y_2$ $a_8 = y_3$ $a_9 = y_5 + x_4 \cdot y_4$ $a_{10} = y_6 + x_5 \cdot y_4$ $a_{11} = x_0 \cdot y_7 + x_0 \cdot y_0.$

* * * * *